United States Patent [19]

Hoffman

[11] 4,281,677
[45] Aug. 4, 1981

[54] SUPPLY VALVE FOR DUAL CIRCUIT SYSTEMS

[75] Inventor: David A. Hoffman, Olmsted Falls, Ohio

[73] Assignee: The Bendix Corporation, Southfield, Mich.

[21] Appl. No.: 94,847

[22] Filed: Nov. 16, 1979

[51] Int. Cl.³ .............................................. F16K 11/02
[52] U.S. Cl. .................................................... 137/113
[58] Field of Search ............................... 137/112, 113

[56] References Cited

U.S. PATENT DOCUMENTS

| 2,358,228 | 9/1944 | Hoof ..................................... 137/113 |
| 2,360,839 | 10/1944 | Barksdale ............................ 137/113 |
| 2,371,293 | 3/1945 | Hoof ................................. 137/113 X |
| 2,445,505 | 7/1948 | Ashton ................................ 137/113 |
| 3,533,431 | 10/1970 | Kuenzel ............................... 137/113 |

FOREIGN PATENT DOCUMENTS

| 500651 | 11/1954 | Italy ......................................... 137/113 |
| 44-24024 | 10/1969 | Japan ....................................... 137/113 |

Primary Examiner—Robert G. Nilson

Attorney, Agent, or Firm—Ken C. Decker; William N. Antonis

[57] ABSTRACT

A supply valve includes a housing with a bore and an outlet and a pair of inlets communicating with the bore. The valve also includes a shuttle slidable in the bore in response to a pressure differential between the inlets to communicate one of the inlets to the outlet and to close the other inlet when the pressure level at the one inlet is greater than the pressure level at the other inlet. The shuttle slides to close the one inlet and communicate the other inlet to the outlet when the pressure differential between the inlets reaches a predetermined level. The shuttle includes a pair of fluid pressure responsive areas corresponding to each of the inlets. At least one of the areas includes one portion communicated to its corresponding inlet and another portion communicated to the outlet when the corresponding inlet is closed, the other portion being communicated to the corresponding inlet when the corresponding inlet is communicated to the outlet. The improved valve also includes restricted orifices providing uninterrupted communication between the outlet and the other portion of the areas and passages communicating the outlet with each of the inlets when the other inlet is closed.

10 Claims, 2 Drawing Figures

SUPPLY VALVE FOR DUAL CIRCUIT SYSTEMS

BACKGROUND OF THE INVENTION

This invention relates to a supply valve for use in a dual circuit braking system.

Double check valves for dual circuit systems operate to communicate either of two fluid pressure supplies to a circuit associated with a vehicle air brake system. Double check valves are used between the two service reservoirs in many air brake systems to supply air pressure to the parking and trailer brake circuits. Tests on typical braking systems have shown that leakage rates of up to 50 psi per minute are required to cause a standard double check valve to isolate a leaking reservoir. This is because at lower leakage rates, the pressure differential between the inlet ports of the check valve is insufficient to cause the shuttle used in the check valve, which responds to a pressure differential between the inlet ports, to seal the inlet port which communicates to the leaking reservoir. As a result, the shuttle "stalls" in the mid-position allowing air to "flow by" from an intact reservoir to a leaking reservoir.

Vehicle tests have shown that even with leakage rates approaching 50 psi, emergency stopping distance requirements can be met. Clearly, however, a valve that does not permit "flow by" would represent an improvement, since it would insure that maximum pressure is maintained in one of the supply circuits after a failure in the other supply circuit.

SUMMARY OF THE INVENTION

The present invention relates to a double area dual circuit supply valve. The valve includes a housing having two inlets connected to separate fluid pressure supplies and an outlet connected to a vehicle brake system. The housing contains a bore within which a shuttle slides in response to the pressure differential between the two supplies. The valve also includes seals which cooperate with the shuttle and the wall of the bore to define dual pressure responsive areas on the shuttle corresponding to each inlet. The valve operates to communicate one or the other of the supplies with the outlet.

If leakage causes the connected supply pressure to be reduced, the pressure diferential acts upon the corresponding small shuttle area to move the shuttle away from the intact supply. This movement then exposes an additional pressure responsive shuttle area to the pressure differential causing the shuttle to complete its movement away from the intact supply. This completed movement communicates the outlet with the intact supply and shuts off communication with the failed supply.

In one embodiment the valve is symmetric and operates on the dual area principle in both directions. In another embodiment a spring on one side of the shuttle moves the shuttle in one direction with the dual area principle operating to provide shuttle movement in the opposite direction.

It is an object of this invention to provide a check valve which will not stall in mid-position.

It is an object of this invention to provide a check valve which eliminates "flow by".

It is an object of this invention to provide a check valve which insures that one or the other of two pressure supplies will always be in communication with a braking system.

DETAILED DESCRIPTION OF FIRST EMBODIMENT

Figure 1:
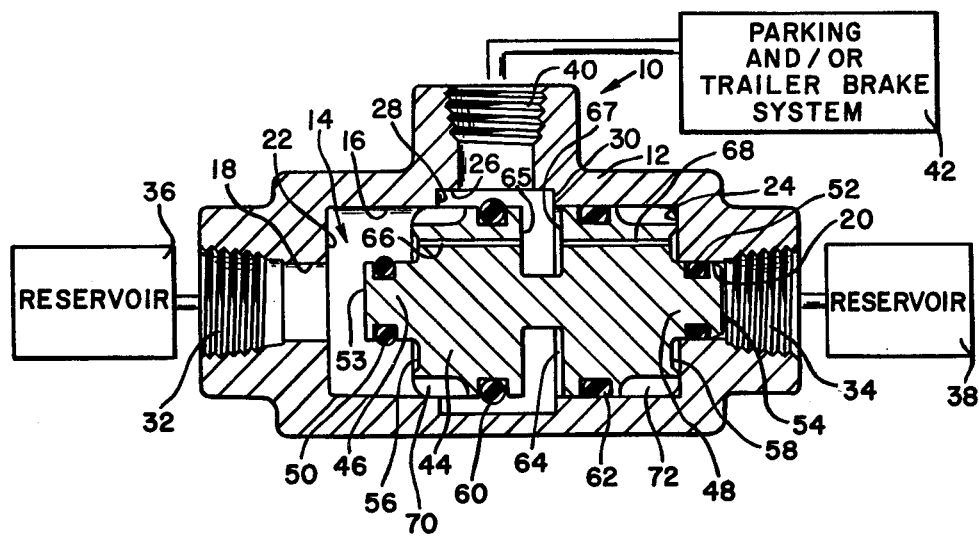
FIG. 1 is a cross-sectional view of the valve mechanism, showing the shuttle in one of its extreme positions of movement.

Referring now to the drawing, and specifically to FIG. 1, a dual circuit supply valve generally indicated by the numeral 10 includes a housing 12 defining a bore 14 therewithin. Bore 14 is stepped to define a larger diameter portion 16 and a pair of smaller diameter portions 18, 20. Smaller diameter portions 18, 20 cooperate with the larger diameter portion 16 to define shoulders 22, 24 therebetween. A circumferentially extending channel 26 circumscribes the larger diameter portion 16 of the bore 14, and cooperates with the larger diameter portion 16 to define a pair of circumferentially extending walls 28, 30. Housing 12 further includes a pair of inlets 32, 34 which communicate corresponding smaller diameter portions 18, 20 of the bore 14 with separated air brake air pressure reservoirs 36, 38 respectively. An outlet or delivery port 40 communicates the annular channel 26 with the vehicle parking and/or trailer brake system indicated diagrammatically as at 42.

A differential pressure responsive shuttle or piston 44 is slidably mounted in the bore 14 and includes a pair of extensions 46, 48 projecting from opposite ends thereof which carry seals 50, 52 respectively. Seals 50, 52 are adapted to sealingly engage the smaller diameter portions of the bore 18 and 20 respectively, as will be more completely disclosed hereinafter. Each of the extensions 46, 48 define a fluid pressure responsive surfaces 54, which are exposed to the fluid pressure area at the corresponding inlets 32, 34. Opposite ends of the shuttle or piston 44 further include annular surfaces 56, 58, which circumscribe the extensions 46, 48. Seals 60, 62 are carried by the piston 44 and are adapted to sealingly engage the larger diameter portion 16 of the bore 14, as will be more completely described hereinafter. An annular channel 64 is defined in the piston 44, and defines annular surfaces 65, 67 on piston 44. Flow-restricting orifices 66, 68 communicate the channel 64 with the opposite ends of the piston 44. The piston 44 is undercut to define channel as at 70, 72 on opposite ends thereof to permit communication between the inlet and outlet ports. The seals 52, 62 and 50, 60 are located on the piston 44 such that the distance between the seals 52, 62 is less than the distance between the shoulder 24 and the circumferentially extending wall 30. Similarly, the distance between seals 50, 60 is less than the distance between the shoulder 22 and the circumferentially extending wall 28. Finally, the distance between shoulder 22 and wall 30 is greater than the distance between shuttle area 56 and seal 62, and the distance between shoulder 24 and wall 28 is greater than the distance between shuttle area 58 and seal 60 so that the outlet 40 always communicates with one or the other of inlets 32, 34.

MODE OF OPERATION OF FIRST EMBODIMENT

The supply valve according to the invention is illustrated in FIG. 1 with the shuttle 44 positioned such that the fluid pressure content of the reservoir 36 is communicated to the parking and/or trailer brake system 42 through the inlet port 32, the outlet port 40, and the channels 70. It will also be noted that, in this condition, the seal 52 is slidably engaged with the smaller diameter portion 20 of the bore 14, thereby preventing communication through the inlet 34. The seal 62 is sealingly engaged with the larger diameter portion 16 of the bore 14, and the annular area 58 is communicated with the pressure level at the inlet port 32 through the flow-restricting orifice 68.

Under certain circumstances, a slow leak may develop in the reservoir 36. When this occurs, the piston 44 is designed to shuttle from the position illustrated in the drawing to a corresponding position in which the seals 50 and 60 are sealingly engaged with the corresponding portions 18 and 16 of the bore 14. When the force exerted on piston 44 due to the pressure level in the reservoir 36 acting across the effective area of surfaces 53 and 56 drops to a level less than the force exerted on the surface 54 due to the fluid pressure level in reservoir 38, the piston 44 begins moving to the left viewing FIG. 1. As the piston moves to the left, the reservoir 36 remains in communication with the system 42 through the channel 70. However, since the distance between the seals 52, 62 is less than the distance between the shoulder 24 and the annular wall 30, a point is reached as the piston shifts in which the seal 48 is moved out of the smaller diameter portion 20 of the bore 14 while the seal 62 remains sealingly engaged with the larger portion 16 of bore 14. At this point, the fluid pressure of reservoir 38 acts across the sum of the areas of the surfaces 54 and 58. Since the force due to the fluid pressure acting across both areas 54 and 58 is now much greater than the force exerted on the effective area of surfaces 53 and 56, the piston 44 shuttles to a position such that the seal 50 is sealingly engaged with the smaller portion 18 of the bore and the seal 60 is sealingly engaged with the larger diameter portion 16 of the bore 14. Because of this abrupt change in effective area, the shuttle 14 cannot stall at a mid-position, thereby permitting cross-communication between the reservoirs 36 and 38 with the brake system 42.

The restricted orifices 66 and 68 vent areas 56 and 58 when the shuttle 44 moves in the bore 14 toward or away from shoulders 22 and 24.

DETAILED DESCRIPTION OF SECOND EMBODIMENT

Figure 2:
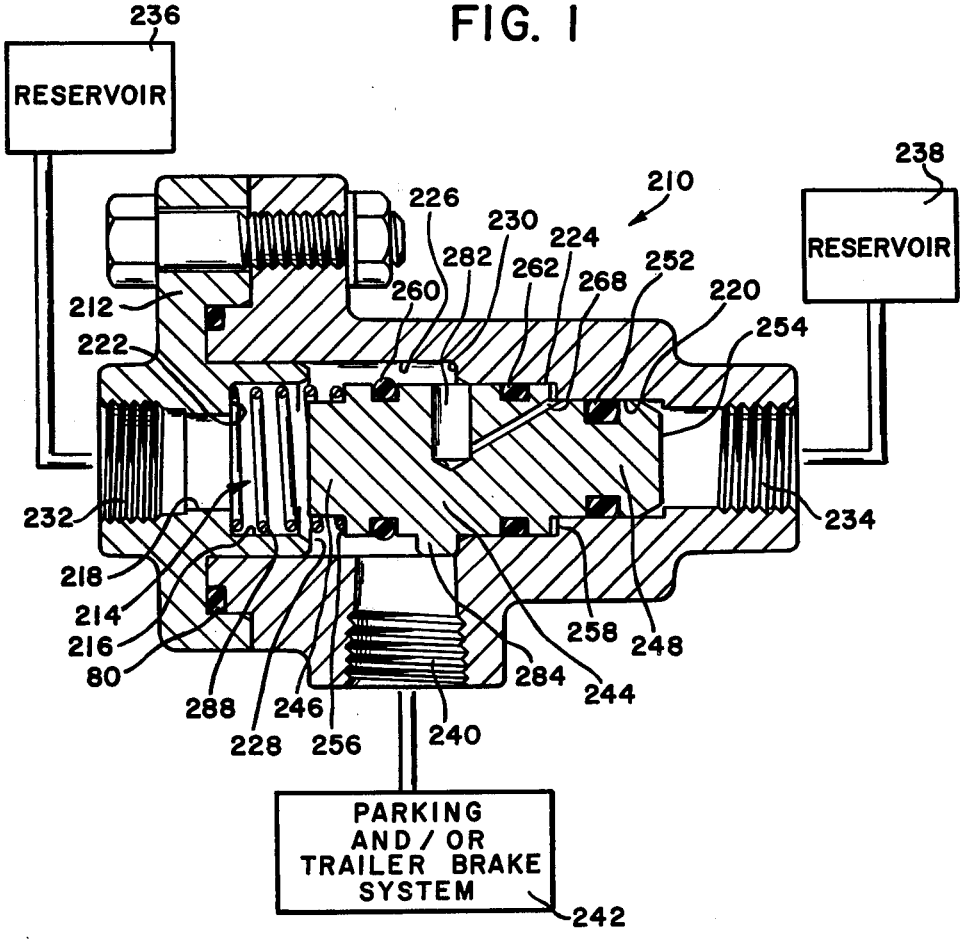
FIG. 2 is a cross-sectional view of an alternate embodiment of the valve mechanism.

An alternate embodiment of this invention is illustrated in FIG. 2 in which parts similar to parts illustrated in FIG. 1 are indicated by the numerals of FIG. 1, but increased by 200. The shuttle 244 includes a blind bore 282. Shuttle 244 also includes a central radial projecting portion 284. The projecting portion 284 engages shoulders 288, 230 to limit the movement of shuttle 244. A coil spring 288 is located in the bore 214 between inlet 232 and the shuttle 244. The spring 288 is biased to urge the shuttle 244 away from the inlet 232 and toward the inlet 234. One end of the spring 288 is retained by shoulder 222. The other end of spring 288 circumscribes shuttle extension 246 and engages shoulder 256.

The distance between shoulder 228 and shoulder 230 is greater than the distance between the edge of projection 284 which engages shoulder 228 and seal 262 so that outlet 240 always communicates with one or the other of inlets 232 or 234. Similar to the embodiment illustrated in FIG. 1, radial bore 282 and channel 268 are arranged so that shuttle area 258 is always communicated to outlet 240 regardless of the position of shuttle 244 within bore 214.

MODE OF OPERATION OF SECOND EMBODIMENT

Referring still to the embodiment illustrated in FIG. 2, under normal conditions, the spring 288 holds the shuttle 244 in the position shown in FIG. 2, permitting communication between inlet 232 and outlet 240. In the event of the loss of pressure at the reservoir 238, no pressure loss will occur at the outlet 240 due to the seal created by the seal 252 with bore 220 and extension 248.

In the event of loss of pressure at the reservoir 236, the pressure at the outlet 240, and at area 258 will decrease until the force differential across shuttle 44 between supply pressures in reservoirs 236 and 238 causes the shuttle 244 to move away from inlet 234. As the shuttle moves toward the port 232, seal 252 leaves bore portion 220, exposing area 258 to the higher pressure of the supply reservoir 238. This pressure increase on the area 258 creates a large force imbalance on the shuttle driving it toward the inlet 232, whereupon the seal 260 creates a seal between shuttle 244 and bore portion 216, thus preventing any pressure loss through supply 236 from outlet 240 through or inlet 238. Continued pressure loss at supply reservoir 236 simply increases the pressure differential across the shuttle, holding it in position and closing the inlet 232 and supply 236. The supply reservoir 238 now communicates with the outlet 240. After the conditions causing reduced pressure in the supply 236 are eliminated and the supply reservoir 236 is repressurized, the spring 288 will return the shuttle 244 to the position illustrated in FIG. 2. The "snap-action" created by the sudden pressure increase on area 258 eliminates "stalling" in the mid-position and valve performance is independent of the rate of pressure loss at either supply.

I claim:

1. In a supply valve, a housing defining a bore therewithin, said housing having an outlet and a pair of inlets communicating with said bore, a shuttle slidable in said bore in response to a pressure differential between said inlets to communicate one of said inlets to said outlet and close the other inlet when the pressure level at said one inlet is greater than the pressure level at the other inlet and sliding to close said one inlet and communicate said other inlet to said outlet when the pressure differential between said inlets reaches a predetermined level, said shuttle including a pair of fluid pressure responsive areas corresponding to each of said inlets, at least one of said pair of areas including one portion communicated to its corresponding inlet and an other portion communicated to the outlet when the corresponding inlet is closed, said other portion being communicated to said corresponding inlet when said corresponding inlet is communicated to said outlet, and orifice means for providing uninterrupted communication between said outlet and said other portion of said areas, said pressure differential operating on said one portion of one of said areas to initiate movement of said shuttle away from said one inlet, said pressure differential operating on both of said portions of said one area to complete the movement of said shuttle, to open said one inlet and to close said other inlet, said valve including resilient means biased to move said shuttle away from said other inlet, to open said other inlet and to close said one inlet when said pressure differential reaches a predetermined level, said bore being stepped to define a larger diameter portion and a pair of smaller diameter portions, one of said smaller portions corresponding to said one inlet and the other smaller portion corresponding to said other inlet, said larger diameter portion cooperating with said smaller diameter portions to define a pair of shoulders corresponding to each of said inlets, said shuttle including a pair of stems projecting from opposite ends of said shuttle, one of said stems defining said one portion of said one area, said shuttle and said stems cooperating to define a pair of annular end faces extending radially outward from said stems, one of said end faces defining said other portion of said one area, said shuttle also including an abutment engaging a corresponding abutment on said bore when said other inlet is closed.

2. The device of claim 1 where said valve includes:
an annular channel communicating with said outlet and circumscribing said larger diameter portion, said larger diameter portion and said channel cooperating to define a pair of circumferentially extending walls corresponding to each of said inlets;
one smaller seal adapted to sealingly engage said one stem and said one smaller diameter bore portion; and
a pair of larger seals for sealing said shuttle with said larger portion of the bore, said larger seals being located between said shoulders and a corresponding one of said walls.

3. The device of claim 2 wherein:
said shuttle carries and seals;
the distance between one of said pair of shoulders and a corresponding one of said pair of circumferentially extending walls is greater than the distance between said one smaller seal and one of said pair of larger seals;
the distance between said one of said pair of shoulders and the other of said pair of circumferentially extending walls is greater than the distance between said one end face and the other of said pair of larger seals; and
the distance between said other wall and said one wall is greater than the distance between said abutment and said one larger seal.

4. The device of claim 3 wherein:
said shuttle includes a bore communicating with said channel, said shuttle bore also communicating with said other portion of said one area through said orifice means.

5. In a supply valve, a housing defining a bore therewithin, said bore being stepped to define larger and smaller diameter portions with a shoulder therebetween, a pair of inlets communicating with said bore, one of said inlets communicating with the smaller portion of said bore, said outlet communicating with said larger portion of the bore, a shuttle slidably mounted in said bore and movable therein in response to a pressure differential between said inlets, said shuttle having a larger section slidable in the larger portion of the bore and a smaller section extending from the larger section, said smaller section being adapted to be slidably received within the smaller portion of the bore, first seal means for providing a sealing engagement between the smaller portion of the bore and the smaller section of the shuttle when the latter is received within the smaller portion of the bore, and second seal means for providing a sealing engagement between the larger portion of the bore and the larger section of the shuttle, and third seal means for providing a sealing engagement between the shuttle and the other inlet when a pressure differential between the inlets forces the shuttle away from the one inlet and opening the one inlet.

6. The supply valve as claimed in claim 5, wherein said shuttle is responsive to pressure differentials between the inlets to break the sealing engagement between the first seal means and the smaller section of the shuttle when the pressure level at the one inlet exceeds the pressure level at the other inlet by more than a predetermined amount, said second seal means continuing to provide sealing engagement between the larger portion of the bore and the larger section of the shuttle until the shuttle moves away from the one inlet a predetermined distance in response to said pressure differential between the inlets.

7. The supply valve as claimed in claim 6, wherein a channel communicating with the outlet circumscribes the larger portion of the bore and said sealing engagement between the larger portion of the bore and the larger section of the shuttle is broken when the larger section of the shuttle carries the second sealing means into said channel in response to movement of the shuttle in response to said pressure differential between the inlets.

8. The supply valve as claimed in claim 7, wherein said first and second sealing means each include components carried on the smaller and larger diameter sections of said shuttle respectively, said channel having a pair of edges, one of said edges being closer to said one inlet than is said other edge, the distance between said components being less than the distance between said shoulder and said one edge.

9. The supply valve as claimed in claim 5, wherein said larger and smaller sections of the shuttle cooperate to define a shoulder therebetween, the shoulder on the shuttle cooperating with the shoulder on the housing to define a chamber therebetween, and a flow restricting orifice communicating said chamber with the outlet.

10. The supply valve as claimed in claim 5, and resilient means yieldably urging said shuttle toward said one inlet.

* * * * *